United States Patent [19]

McConnell

[11] Patent Number: 5,405,292
[45] Date of Patent: Apr. 11, 1995

[54] HARVESTER SHIELD

[75] Inventor: Kenneth C. McConnell, Ankeny, Iowa

[73] Assignee: Deere & Company, Moline, Ill.

[21] Appl. No.: 169,896

[22] Filed: Dec. 20, 1993

[51] Int. Cl.$^6$ .................. A01D 75/00; A01F 12/00
[52] U.S. Cl. .................. 460/119; 460/150; 56/1
[58] Field of Search .................. 460/119, 149, 150; 56/1, 28, 320.1, 330, 17.4, DIG. 9, DIG. 20, DIG. 24

[56] References Cited

U.S. PATENT DOCUMENTS

| | | | |
|---|---|---|---|
| 2,616,353 | 11/1952 | Thomann | 56/14.7 X |
| 5,174,101 | 12/1992 | Rabitsch | 56/17.4 |
| 5,181,371 | 1/1993 | DeWorth | 56/320.1 X |
| 5,181,373 | 1/1993 | Littau | 56/330 X |
| 5,251,427 | 10/1993 | Ulschmid et al. | 56/1 |

*Primary Examiner*—Terry Lee Melius

[57] ABSTRACT

A harvester shield includes horizontal overlapping shingled panels supported by a framework between the drive tires and behind the cross axle of a harvester such as a cotton picker to protect otherwise vulnerable machine components and to allow the plants to smoothly pass under the machine with minimal crop damage. As the panels move and flex, residue on top of the panels drop out between the shingled surfaces to provide a self-cleaning effect. The panels are fabricated from polyethylene and can flex easily to avoid panel damage, for example, when the machine has to be backed up in tall standing crops. The shingling effect provides strength to resist flexing upwardly into the machine components as the rear portion of each panel contacts the forward supporting portion of the rearwardly adjacent panel. In an alternate embodiment, shortened panels are supported in non-overlapping fashion by angle structure having a substantial fore-and-aft component. As the plants work rearwardly relative to the underside of the machine, the panel and angle structure hold the plant away from the machine components. A space of about one inch between the rear edge of one panel and the angle structure for the adjacent rearward panel allows a substantial open area to facilitate trash removal from the panel area.

18 Claims, 3 Drawing Sheets

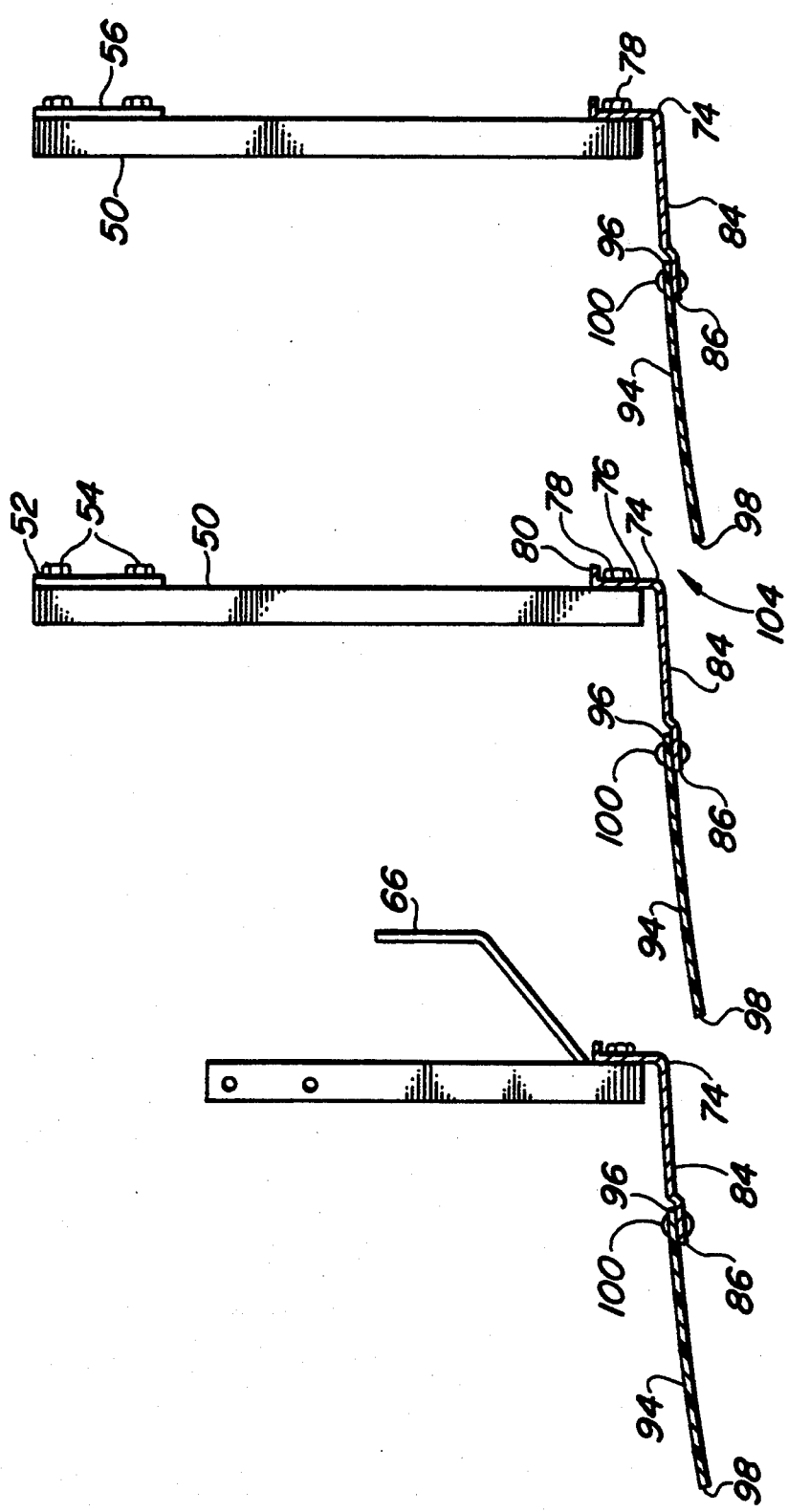

HARVESTER SHIELD

BACKGROUND OF THE INVENTION

1. Field of the Invention

The present invention relates generally to crop harvesters and, more specifically, to a crop shield for a cotton harvester or similar agricultural implement.

2. Related Art

Cotton harvesters typically operate in standing cotton that can be substantially taller than the underside of the machine. As such a harvester passes through the crop, the crop can extend into the machine components causing damage to both the crop and the machine. To reduce such damage, metal shields are placed between the components and the crop. However, these shields are relatively heavy and expensive and subject to permanent damage. The shields often accumulate crop residue which also can interfere with proper machine operation if not cleared at fairly regular intervals. Clearing the shielded area can be very difficult and time consuming.

BRIEF SUMMARY OF THE INVENTION

It is therefore an object of the present invention to provide an improved crop shield for a harvester which overcomes most or all of the above-mentioned problems. It is a further object to provide such an improved crop shield which is relatively simple and inexpensive in construction.

It is a further object of the present invention to provide an improved crop shield for a harvester which does not accumulate crop residue. It is a further object to provide such a shield which is self-cleaning. It is yet another object to provide such a shield which allows the plants to smoothly pass under the machine substantially without damage.

It is still another object of the present invention to provide an improved crop shield for a harvester which is less subject to damage than at least most previously available shields. It is a further object to provide such a shield which protects the width of the machine between the drive wheels and the length of the machine from the cross axle rearward past the engine.

It is another object to provide a harvester shield having shingled, flexible panels with flat plant-contacting surfaces for smooth plant flow under the machine and for improved residue cleaning.

A harvester shield constructed in accordance with the teachings of the present invention includes horizontal overlapping shingled panels supported by a framework between the drive tires and behind the cross axle of a harvester such as a cotton picker. The overlapping shingled construction using generally flat panels protects otherwise vulnerable machine components and allows the plants to smoothly pass under the machine. As the panels move and flex, residue on top of the panels drop out between the shingled surfaces to provide a self-cleaning effect that eliminates residue build-up and the need for shield removal and time-consuming manual cleaning. The panels are inexpensive and light and can flex easily to avoid panel damage, for example, when the machine has to be backed up in tall standing crops. The shingling effect provides strength to resist flexing upwardly into the machine components as the rear portion of each panel flexes through a path that intercepts the forward supporting portion of the rearwardly adjacent panel.

In an alternate embodiment of the invention, shortened panels are supported in non-overlapping fashion by angle structure having a substantial fore-and-aft component for supporting the forward edges of the panels rearwardly of the brackets. As the plants work rearwardly relative to the underside of the machine, the panel and angle structure hold the plant away from the machine components. A space of about one inch between the rear edge of one panel and the angle structure for the adjacent rearward panel allows a substantial open area to facilitate trash removal from the panel area.

These and other objects, features and advantages of the present invention will become apparent to one skilled in the art upon reading the following detailed description in view of the drawings.

BRIEF DESCRIPTION OF THE DRAWINGS

FIG. 3 is a enlarged side view of an alternate embodiment of the plant shield.

DETAILED DESCRIPTION OF THE DRAWINGS

Figure 1:
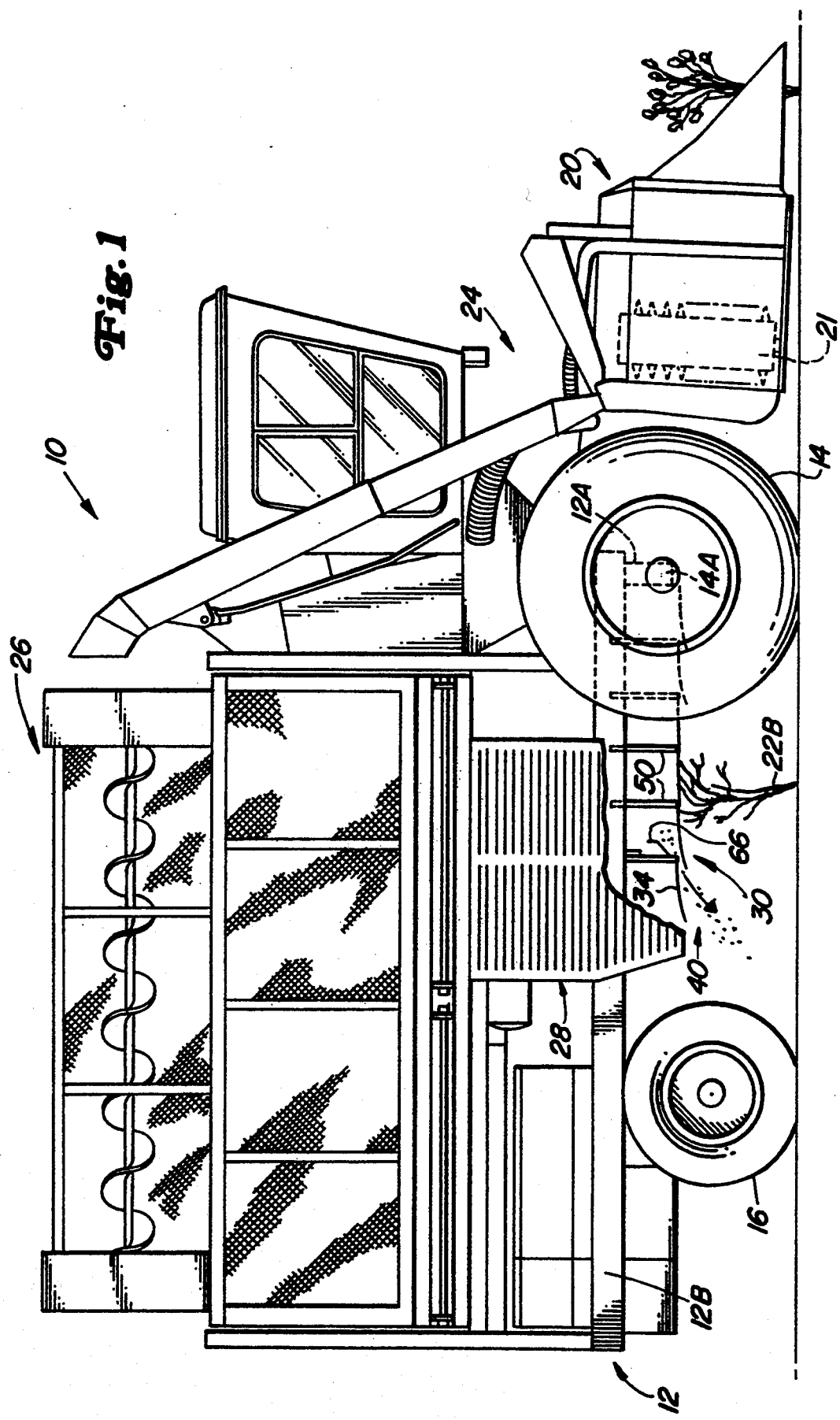
FIG. 1 is a side view of cotton harvester with portions broken away to better show the plant shield constructed in accordance with the teachings of the present invention.

Referring now to FIG. 1, therein is shown a cotton harvester 10 having a main frame 12 supported for forward movement over the ground by transversely spaced forward drive wheels 14 on axles 14A and rear steerable wheels 16. A plurality of transversely spaced row harvesting units 20 with upright picking drums 21 are supported from the forward end of the frame 12 for removing cotton from rows of plants 22. An air duct system 24 conveys removed cotton upwardly and rearwardly to a basket 26 supported on the frame 12. Conventional harvester components, indicated generally at 28 in FIG. 1 and including engine, transmission, fan, and hydraulic components and hoses and electric lines, are supported from the frame 12, some below the frame 12 and below the level of the tallest plants 22 that are encountered by the harvester 10.

As shown in the Figures, the frame 12 includes a pair of transversely spaced, fore-and-aft extending main beams 12B. A transversely extending connecting beam 12A is attached to the beams 12B and extends below the beams 12B near the axles 14A. Shield structure 30 is suspended from the frame 12 between the drive wheels 14. The width of the shield structure 30 is slightly less than the distance between the wheels 14, and the structure extends rearwardly below substantially the entire component area 28, terminating forwardly of the rear wheels 16. The shield structure 30 includes a plurality of rectangular sheets 34 of a flexible material, preferably polyethylene. Each sheet 34 includes a front edge 36 joined by side edges 37 to a rear edge 38. The sheets 34 are supported adjacent each other in overlapping, generally horizontal relationship in shingled fashion so that the rear edge 38 of one sheet 34 extends below the front edge 36 of the rearwardly adjacent sheet 34 with the front edge lending resistance to upward movement of the adjacent rear edge 38 when a plant (see 22B of FIG. 1) brushes against the underside of the sheet. Fore-and-aft extending reinforcing ribs 39, which may be molded directly into the sheets 34, provide resistance to bending of the sheets about transverse axes to maintain the rear edge 38 offset downwardly only a slight distance from the adjacent forward edge 36. In the normal operational position of the sheets 34, there is a rearward and downward slope to the upper surfaces so that trash and debris, indicated generally at 40 slides rearwardly off the sheet through the vertical gap between adjacent front and rear edge pairs (36,38). A sheet 34 can flex rearwardly (34B) to prevent damage when backing up in tall crops.

Figure 2:
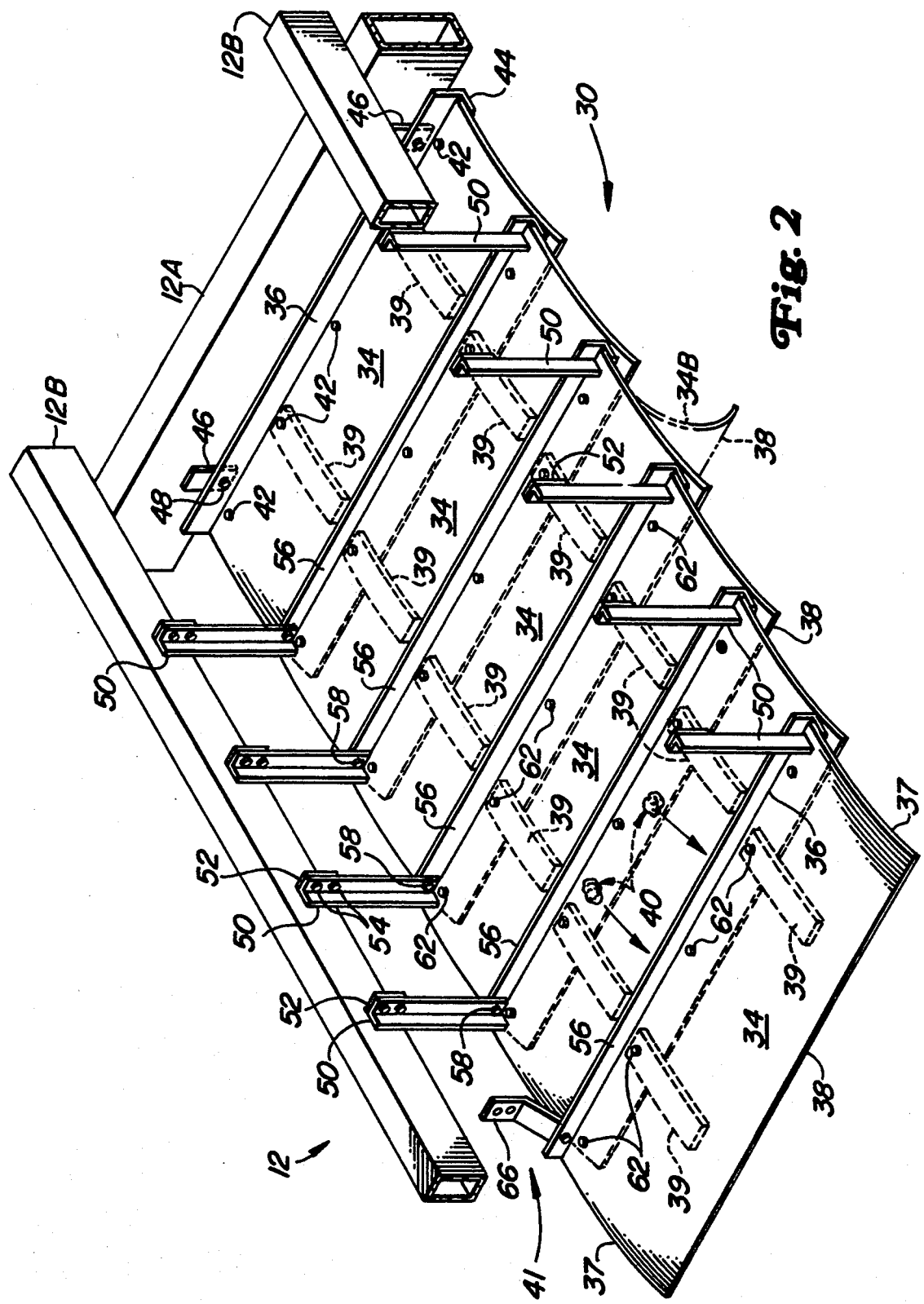
FIG. 2 perspective view of the plant shield of FIG. 1 with portions of the supporting framework broken away to better show the shingling action of the shield panels.

As shown in Figures, the sheets 34 are supported from the frame 12 by bracket and hanger structure indicated generally at 41 in FIG. 2. The forwardmost sheet 34 is connected by five transversely spaced bolts 42 to the horizontal flange of an angle 44. The upright flange of the angle 44 is secured by brackets 46 and bolts 48 to the rear face of the beam 12A with the front edge 36 of the forward sheet generally aligned vertically with the bottom of the beam 12A. A plurality of angles or hangers 50 are uniformly spaced in the fore-and-aft direction on the inside surfaces of the beams 12B and have rearward flanges connected to the beams by brackets 52 and bolts 54. Transversely extending angles 56 are connected between pairs of the hangers 50 by bolts 58 which extend through the rear flanges of the hangers 50 and through the upright flanges of the angles 56. The forward portions of the sheets 34 are connected to the horizontal flanges of the angles 56 by five transversely spaced bolts 62. Preferably, two of the bolts 62 pass through the reinforcing ribs 39 to secure the ribs against the horizontal flange of the angle 56. An additional bracket such as shown at 66 may be used to secure an end of an angle 56 to another portion of the frame if necessary.

In the embodiment shown in FIG. 3, sheet metal angles 74 having vertical flanges 76 are connected by bolts 78 to the rear flanges of the angles 50. A reinforcing flange 80 extends the width of the vertical flange 76. The angles 74, as clearly seen in FIG. 3, have a generally horizontal flange 84 with a substantial fore-and-aft dimension for resisting upward deflection of plants into the component area 28. A vertical offset 86 defines the transverse rearward edge of the flange 84. Shortened rectangular flexible panels 94 with transverse forward edges 96 and rear edges 98 parallel to the forward edges are fixed at their forward edges to the respective offsets 86 by fasteners 100. The rear edge 98 of a forward panel 94 is supported forwardly of the rearward adjacent angle 74 to define a relatively large discharge area 104, and the panels and flanges slope slightly downward in the rearward direction so debris falls easily from the top surfaces of the panels 94 and the flanges 84 during operation of the harvester. Preferably, the panels 94 are fabricated from polyethylene.

Having described the preferred embodiment, it will become apparent that various modifications can be made without departing from the scope of the invention as defined in the accompanying claims.

I claim:

1. In a harvester having a main frame supported for movement over a field of standing crops, the main frame supporting harvester components at least a portion of which extend downwardly from the frame below the level of the tallest crops, a shield comprising:

a plurality of sheets of material having upper and lower surfaces and forward and rearward edges; and means supporting the sheets adjacent the components, with one sheet behind the next in generally horizontal relationship, wherein the forward edge of one of the sheets adjoins the rearward edge of the sheet forwardly adjacent said one of the sheets for preventing contact between the tallest crops and the components while presenting the lower surfaces in a generally planar configuration to the crop to prevent crop damage, wherein the sheets are flexible and provide a discharge area between the forward edge of said one of the sheets and the rearward edge of the forwardly adjacent sheet for facilitating residue removal from the top surfaces of the sheets.

2. The invention as set forth in claim 1 wherein the sheets overlap to provide a shingling effect and the sheets are generally concave downwardly to provide an opening defining the discharge area above the rear edge of the sheets.

3. The invention as set forth in claim 1 wherein the rear edge of one sheet is located forwardly of the forward edge of the sheet rearwardly adjacent said one sheet to define the discharge area.

4. The invention as set forth in claim 3 wherein the means supporting the sheets comprises bracket structure connected to the frame, and a relatively nonflexible horizontal support connected to the bracket structure and to the panel, the horizontal support rearwardly offsetting the forward edge of the panel and assisting the panel in holding down crop.

5. In a harvester having a main frame supported for movement over a field of standing crops, the main frame supporting harvester components at least a portion of which extend downwardly from the frame below the level of the tallest crops, a shield comprising:

a plurality of sheets of material having upper and lower surfaces; and means extending below the frame and supporting the sheets adjacent each other in overlapping, generally horizontal relationship adjacent the components for preventing contact between the tallest crops and the components, wherein the sheets are flexible to provide a discharge area for crop residue adjacent the overlapping portions of the sheets to prevent residue build-up on the sheets.

6. The invention as set forth in claim 5 wherein the sheets of material comprise polyethylene sheets.

7. The invention as set forth in claim 5 wherein the means supporting the sheets comprise a plurality of fore-and-aft spaced, transversely extending supports connected to the frame, and the sheets comprise rectangular plastic material having a forward edge connected to the support and extending rearwardly to a rear edge supported under the next adjacent support.

8. The invention as set forth in claim 7 further including panel reinforcing structure providing resistance to bending of the panel about a transverse axis to thereby retain the rear edge of one of the panels close the forward edge of the rearwardly adjacent panel.

9. In a cotton harvester having a fore-and-aft extending main frame supported for forward movement over a field of cotton plants by transversely spaced forward drive wheels and rear steerable wheels, the harvester including an underside portion supporting components between the forward drive wheels and rear steerable wheels wherein the components are subject to damage by the plants and residue from the plants, shield structure for reducing contact between the plants and preventing build up of residue, the shield structure comprising:

transversely extending support members supported in fore-and-aft space relationship with respect to each other from the main frame below the components;

a plurality of flexible panels having forward edges and rearward free edges; and connector structure securing the forward edges of the panels to the support members to provide a deflection surface between the forward drive wheels and the rear steerable wheels.

10. The invention as set forth in claim 9 wherein the panels include forwardmost panels each having a rear edge supported in overlapping fashion under the forward edge of the rearward adjacent panel for providing a generally continuous deflection surface.

11. The invention as set forth in claim 9 wherein the panels have a length less than the distance between the support members and defining with the support members a trash-relieving gap for facilitating continuous debris removal from the panels.

12. The invention as set forth in claim 9 wherein the panels include a forwardmost panel supported adjacent the axles of the forward drive wheels.

13. The invention as set forth in claim 9 wherein the support members include upright supports with upper ends connected to the main frame and lower ends connected by transversely extending angles having generally horizontal flanges, wherein the forward edges of the panels are connected to the horizontal flanges.

14. The invention as set forth in claim 13 wherein the horizontal flanges define a portion of the deflection surface.

15. The invention as set forth in claim 13 wherein the rear edge of one of the panels extends below the flange of the adjacent angle and the panel has a deflection path that intercepts said flange of the adjacent angle.

16. The invention as set forth in claim 13 wherein the length of each of the panels is less than the distance between adjacent angles so that a gap is defined between the rear edge of the panel and the adjacent angle for permitting debris to exit the area above the panels.

17. The invention as set forth in claim 15 wherein the panel is concave downwardly and the rear edge of the panel is supported a sufficient distance below the flange to define a vertical gap between the edge and the flange so debris can slide rearwardly off the panel.

18. The invention as set forth in claim 17 further comprising a fore-and-aft panel stiffening rib connected to the panel for limiting downward flexing of the rear edge of the panel.

* * * * *